US012250091B2

(12) United States Patent
Feldman (10) Patent No.: US 12,250,091 B2
(45) Date of Patent: Mar. 11, 2025

(54) FACILITATING SMART DEVICE CONTROL USING POSITIONING TAGS

(71) Applicant: Google LLC, Mountain View, CA (US)

(72) Inventor: Arnold Feldman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 400 days.

(21) Appl. No.: 17/889,929

(22) Filed: Aug. 17, 2022

(65) Prior Publication Data

US 2024/0064039 A1 Feb. 22, 2024

(51) Int. Cl.
*H04L 12/28* (2006.01)
*H04W 4/02* (2018.01)
*H04W 4/80* (2018.01)

(52) U.S. Cl.
CPC ........ *H04L 12/2827* (2013.01); *H04L 12/282* (2013.01); *H04W 4/023* (2013.01); *H04W 4/025* (2013.01); *H04W 4/80* (2018.02); *H04L 2012/2841* (2013.01)

(58) Field of Classification Search
CPC .... H04L 12/2827; H04L 12/282; H04W 4/80; H04W 4/023; H04W 4/025
See application file for complete search history.

(56) References Cited

U.S. PATENT DOCUMENTS

| | | | |
|---|---|---|---|
| 9,503,854 B1 | 11/2016 | Kulfan et al. | |
| 10,163,336 B1 | 12/2018 | VanDuyn et al. | |
| 11,402,984 B2* | 8/2022 | Sharifi | G06F 3/167 |
| 11,425,572 B2* | 8/2022 | Eom | H04W 12/50 |
| 2014/0226035 A1 | 8/2014 | Nurmenniemi | |
| 2016/0174035 A1* | 6/2016 | Hughes | H04W 4/023 |
| | | | 455/456.3 |
| 2016/0180672 A1 | 6/2016 | Hoehn et al. | |
| 2017/0242092 A1 | 8/2017 | Marquez et al. | |
| 2017/0295466 A1* | 10/2017 | Strutt | H04W 4/70 |

\* cited by examiner

*Primary Examiner* — Mark A Connolly
(74) *Attorney, Agent, or Firm* — Kilpatrick Townsend & Stockton LLP (57) ABSTRACT

Various arrangements for using a positioning tag to facilitate control of a smart home device are presented herein. A communication sessions can be established between a control device and a positioning tag via a first device-to-device communication protocol. In response to a trigger event indicative of a user desiring to control the separate smart home device being detected, a positioning enablement message can be transmitted to the positioning tag via the first device-to-device communication protocol. A signal used for positioning is transmitted by the positioning tag using a second device-to-device communication protocol. Based on the received signal via the second device-to-device communication protocol, an interface that controls the smart home device is activated.

20 Claims, 6 Drawing Sheets

FACILITATING SMART DEVICE CONTROL USING POSITIONING TAGS

BACKGROUND

Smart devices frequently rely on a specialized application executed on a computerized device, such as a smartphone, for user interactions. For a user to control or otherwise interact with a smart device, the user opens the particular application or interface mapped to the smart device. Especially for users who have many smart devices or for a user who is desirous of interacting with an infrequently used smart device, accessing the correct application or interface may be time-consuming and frustrating.

SUMMARY

Various embodiments are described related to a system for controlling a smart home device. In some embodiments, a system for controlling a smart home device is described. The system may comprise a positioning tag. The positioning tag may comprise a positioning tag housing. The positioning tag may comprise a first device-to-device communication interface housed by the positioning tag housing that may use a first device-to-device communication protocol. The positioning tag may comprise a second device-to-device communication interface housed by the positioning tag housing that may use a second device-to-device communication protocol. The positioning tag may comprise a processing system, comprising one or more processors, housed by the positioning tag housing, and in communication with the first device-to-device communication interface and the second device-to-device communication interface. The positioning tag may be mapped to a separate smart home device. The system may comprise an application executed by a mobile computerized control device. The application may be configured to cause the mobile computerized control device to establish a session with the positioning tag via the first device-to-device communication protocol. The application may be configured to cause the mobile computerized control device to detect a trigger event indicative of a user desiring to control the separate smart home device. The application may be configured to cause the mobile computerized control device to, in response to detecting the trigger event, cause the mobile computerized control device to transmit a positioning enablement message to the positioning tag via the first device-to-device communication protocol. The application may be configured to cause the mobile computerized control device to receive a distance measurement signal via the second device-to-device communication protocol. The application may be configured to cause the mobile computerized control device to, based on the received distance measurement signal via the second device-to-device communication protocol, cause a smart device interface that controls the separate smart home device to be activated on the mobile computerized control device.

Embodiments of such a system may include one or more of the following features: the received distance measurement signal may be used by the mobile computerized control device to determine a distance to the positioning tag from the mobile computerized control device based upon a time-of-flight analysis. The received distance measurement signal may be used by the mobile computerized control device to determine an orientation of the mobile computerized control device relative to the positioning tag. The first device-to-device communication protocol may be Bluetooth Low Energy (BLE), and the second device-to-device communication protocol may be ultra-wide band (UWB). The system may comprise the mobile computerized control device. The mobile computerized control device may be a smartphone. The system may comprise the mobile computerized control device. The mobile computerized control device may be a smartwatch. The trigger event may be detected by the mobile computerized control device without explicit input from the user. The trigger event may comprise user input. The positioning tag may not communicate with the smart home device. The smart device interface may be a second application installed on the mobile computerized control device, the second application being separate from the application.

In some embodiments, a method for facilitating control of a smart home device is described. The method may comprise establishing, by a control device, a communication session with a positioning tag via a first device-to-device communication protocol. The method may comprise detecting, by the control device, a trigger event indicative of a user desiring to control the smart home device. The method may comprise, in response to detecting the trigger event, transmitting, by the control device, a positioning enablement message to the positioning tag via the first device-to-device communication protocol. The method may comprise receiving, by the control device, a distance measurement signal from the positioning tag via a second device-to-device communication protocol. The method may comprise, based on the received distance measurement signal via the second device-to-device communication protocol, causing, by the control device, a smart device interface that controls the smart home device to be activated on the control device.

Embodiments of such a method may include one or more of the following features: the positioning tag may comprise a first device-to-device communication interface that may use the first device-to-device communication protocol. The positioning tag may comprise a second device-to-device communication interface that may use the second device-to-device communication protocol. The method may further comprise determining, by the control device, a relative orientation of the control device with respect to the positioning tag using the received distance measurement signal. The smart device interface caused to be activated may be further based on the determined relative orientation. The method may further comprise identifying the positioning tag based at least in part on the distance measurement signal. Identifying may be performed by analyzing a distance measurement based on the distance measurement signal using a stored tag mapping. The first device-to-device communication protocol may be Bluetooth Low Energy (BLE), and second device-to-device communication protocol may be ultra-wide band (UWB). The control device may be selected from the group consisting of: a smartphone, a smartwatch, and a tablet computer. The smart device interface may be a second application installed on the control device, the second application being maintained by an entity separate from an entity that may provide the positioning tag.

In some embodiments, a non-transitory processor-readable medium for facilitating control of a smart home device by a control device is described. The medium may comprise processor-readable instructions configured to cause one or more processors to establish a communication session with a positioning tag via a first device-to-device communication protocol. The medium may comprise processor-readable instructions configured to cause one or more processors to detect a trigger event indicative of a user desiring to control the smart home device. The medium may comprise processor-readable instructions configured to cause one or more processors to, in response to detecting the trigger event, cause a positioning enablement message to be transmitted to the positioning tag via the first device-to-device communication protocol. The medium may comprise processor-readable instructions configured to analyze a distance measurement signal received from the positioning tag via a second device-to-device communication protocol. The medium may comprise processor-readable instructions configured to, based on the received distance measurement signal via the second device-to-device communication protocol, cause a smart device interface that controls the smart home device to be activated on the control device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Positioning tags, as detailed herein, are low power devices that can allow for a distance, relative orientation, or both between the positioning tag and a computerized control device to be determined. As detailed herein, such positioning tags can be used to facilitate the use of other smart home devices.

A user may have some number of smart home devices within the user's home (or in some other type of location, such as an office, warehouse, or other form of structure). These smart home devices may rely on individual smart device interfaces, which can be separate applications, separate interfaces within an application or operating system, or some combination thereof. When a user wants to control a particular smart home device, the user may typically launch the application or interface within an application for the particular smart home device.

In contrast, as detailed herein, a positioning tag may be mapped to a map to a particular smart home device. The positioning tag may transmit a signal that allows a distance, relative orientation, or both to the positioning tag from a computerized control device to be determined. The distance and orientation may be used to determine the particular smart home device with which the user desires to interact. In response to the determination, the application or interface within an application for the smart home device is launched, selected, or otherwise activated.

No communication between the positioning tag and the smart device to be controlled using the computerized control device is necessary. Rather, based on the measurements between the computerized control device and the positioning tag, the computerized control device, possibly in combination with a remote server, determines which smart device is to be controlled. Even if the smart device is a third-party device having no affiliation with the entity operating a control application on the control device, the computerized control device can launch, select, or otherwise activate a corresponding application for the third-party device to allow the user to control or otherwise interact with the third-party device.

Embodiments detailed herein can use ultra-wide band (UWB) to determine the distance and orientation between the computerized control device and the positioning tag. In order to limit the amount of power consumed by the positioning tag, a lower power device-to-device communication protocol may be used to communicate when the positioning tag should enable UWB. For example, BLE may allow for communication sessions to be established between the computerized control device and the positioning tag. When a trigger event is detected, which can include detection of the user's intent or direct user input, a message can be transmitted via BLE to activate UWB. UWB signals may then be exchanged between the computerized control device and the location device to determine distance (e.g., based on time of flight) and orientation of the computerized control device with respect to the positioning tag (e.g., based on angle of arrival).

Figure 1:
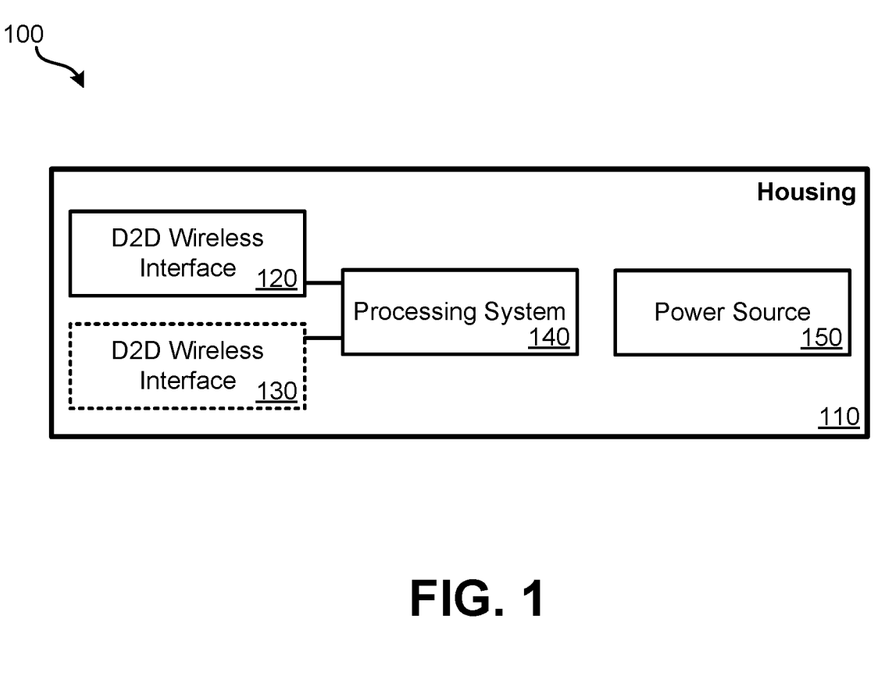
FIG. 1 illustrates an embodiment of a block diagram of a positioning tag.

Further detail regarding these embodiments and others are provided in relation to the figures. FIG. 1 illustrates an embodiment of a block diagram of positioning tag 100. Positioning tag 100 can include: housing 110; device-to-device ("D2D") wireless interface 120; device-to-device wireless interface 130; processing system 140 and power source 150. Housing 110 may house all other components of positioning tag 100. In some embodiments, on positioning tag 100 external to housing 110 may be a fastener to attach housing 110 with another object. For example, the fastener may be hook and loop (e.g., Velcro®), adhesive, or a magnet. In some embodiments, a hole may be formed by housing 110 to accept a fastener, such as a hook, screw, or nail. Housing 110 may be relatively small, such as smaller than 5 cm by 5 cm by 5 cm. Housing 110 may be made from a semi-rigid or rigid material.

Power source 150 can represent an on-board power source, such as one or more batteries and a battery interface. Power source 150 can supply power to device-to-device wireless interface 120, device-to-device wireless interface 130; and processing system 140. If one or more batteries are used, the batteries may be single-use or rechargeable.

Device-to-device wireless interface 120 represents a low-power device-to-device wireless communication interface that uses a low-power device-to-device communication protocol. For example, device-to-device wireless interface 120 may use ultra-wide band (UWB). In other embodiments, instead of UWB, device-to-device wireless interface 120 may use WiFi Round Trip Time (RTT), BLE High Accuracy Distance Measurements (HADM), or some other form of device-to-device ranging. While UWB and WiFi RTT rely on ToF measurements, BLE HADM uses a combination of ToF and phase measurements. Device-to-device wireless interface 120 allows for two devices to communicate directly without the use of an intervening wireless router. Further, device-to-device wireless interface 120 can allow for two devices to perform a distance measurement (e.g., time-of-flight (ToF) measurement) and/or angle-of-arrival (AoA) analysis to determine the distance and/or relative orientation, respectively, of a device with respect to positioning tag 100. In response to a positioning message, after a fixed amount of delay, device-to-device wireless interface 120 can respond with its own positioning message. By subtracting the known amount of delay, the distance can be determined based on the elapsed amount of time from a device sending a positioning message to positioning tag 100 and receiving the positioning message response from positioning tag 100.

The amount of power used by device-to-device wireless interface 120 can be low, but on average higher than that of device-to-device wireless interface 130. Therefore, it may be more efficient to only enable device-to-device wireless interface 120 when a distance and relative orientation analysis is to be performed.

Device-to-device wireless interface 130 represents a low-power device-to-device wireless communication interface that uses a different low-power device-to-device communication protocol than device-to-device wireless interface 120. For example, device-to-device wireless interface 130 may use BLE. Device-to-device wireless interface 130 allows for two devices to communicate directly without the use of an intervening wireless router. The communication protocol used by device-to-device wireless interface 130 can involve a session being established between device-to-device wireless interface 130 and a control device when the two devices are within communication range of each other. Device-to-device wireless interface 130 is not present in all embodiments; rather, in some embodiments, only device-to-device wireless interface 120 is present. However, when device-to-device wireless interface 130 is present, device-to-device wireless interface 130 may receive a message via device-to-device wireless interface 130 that instructs processing system 140 to activate device-to-device wireless interface 120. Such an arrangement may be preferable because device-to-device wireless interface 120 uses more power on average than device-to-device wireless interface 130; therefore, keeping device-to-device wireless interface 120 deactivated when not needed for positioning purposes reduces the total power consumption of positioning tag 100.

Processing system 140 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD). Generally, processing system 140 may control the activation and deactivation of device-to-device wireless interface 120 based on communications with device-to-device wireless interface 130.

Figure 2:
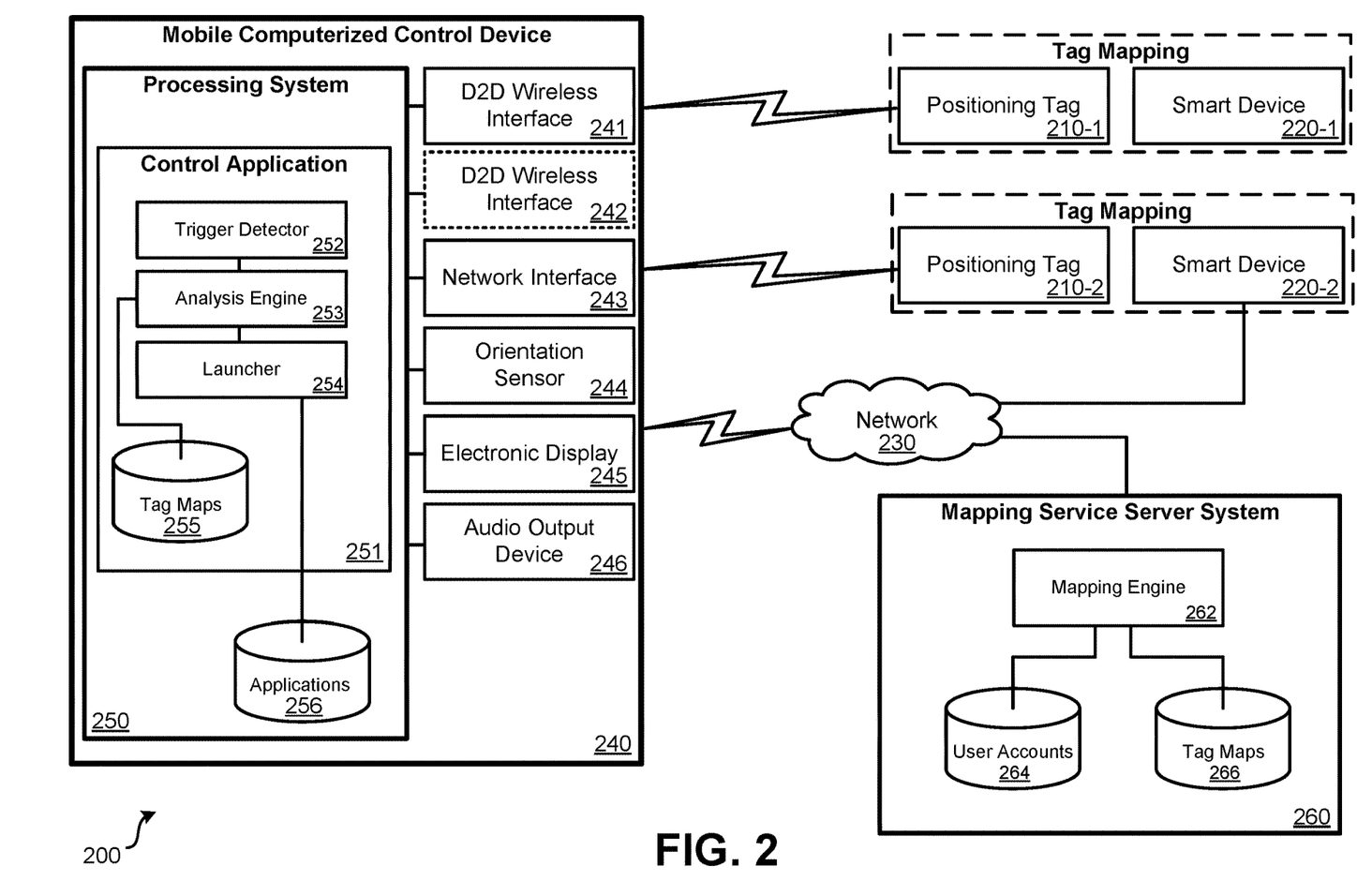
FIG. 2 illustrates an embodiment of a block diagram of a system for controlling smart home devices using positioning tags.

FIG. 2 illustrates an embodiment of a block diagram of system 200 for controlling smart home devices using positioning tags. System 200 can include: positioning tags 210 (e.g., 210-1, 210-2); smart devices 220 (e.g., 220-1, 220-2); mobile computerized control device 240; network 230; and mapping service server system 260 ("system 260"). Positioning tags 210 can represent embodiments of positioning tag 100 of FIG. 1 or some other form of positioning tag. Each positioning tag of positioning tags 210 may be physically placed on or nearby a smart device with which the positioning tag will be or has been mapped.

Smart devices 220 can represent any form of device that may be controlled remotely via an interface or application executed by a separate computerized device. For example, smart devices 220 can be: smart televisions; gaming systems; streaming devices (e.g., streaming sticks such as a Google Chromecast); network-enabled set top boxes; smart thermostats; smart alarm systems; smart carbon monoxide detectors; smart doorbells; smart video or smart security cameras; home assistant devices; smart speakers; smart lights; smart home hubs; smart outlets; smart switches; smart air conditioners; smart home systems (e.g., a smart pool controller), and smart appliances. In some situations, a positioning tag is placed on or affixed to the smart device. For example, positioning tag 210-1 can be placed on a smart television, which in this example is smart device 220-1. In other situations, a positioning tag is placed nearby the smart device. For example, positioning tag 210-2 may be placed on a shelf near smart device 220-2, which is a smart lamp. In still other situations, a positioning tag may be placed remotely from a smart device with which it is or will be associated but is in a position that makes logical sense for one or more users to interact with the smart device. For example, a positioning tag may be placed indoors near a front door with the positioning tag mapped to a smart doorbell located at a front gate.

Notably, positioning tags 210 do not require any form of wireless or wired communication with smart devices 220-1. Therefore, for example, despite positioning tag 210-1 being mapped to smart device 220-1, no communication between positioning tag 210-1 and smart device 220-2 is needed.

Mobile computerized control device 240 ("control device 240") may be used to interact with smart devices 220, either via direct communication or via a network. Control device 240 may communicate directly with positioning tags 210. In general, control device 240 may be any form of mobile computerized device that a user may carry to interact with smart devices. For example, control device 240 can be a: smartphone; smartwatch; gaming device; tablet computer; tablet portion of a home assistant device; or laptop computer. In other embodiments, control device 240 may be purpose-built for functioning as part of system 200.

Control device 240 can include various components including: device-to-device wireless interface 241; device-to-device wireless interface 242; network interface 243; orientation sensor 244; electronic display 245; audio output device 246; and processing system 250. Device-to-device wireless interface 241 corresponds to the low-power communication protocol of device-to-device wireless interface 120; device-to-device wireless interface 242, if present, corresponds to the low-power communication protocol of device-to-device wireless interface 130. Device-to-device wireless interface 241 can include more than one antenna separated by a distance. By using multiple antennas, an AoA analysis can be performed to determine a direction toward a positioning tag. Said another way, the AoA analysis can be performed to determine an orientation of control device 240 with respect to a positioning tag. As detailed in relation to FIG. 1, device-to-device wireless interface 130 may, on average, use less power than device-to-device wireless interface 120 and therefore it may be more power efficient to use device-to-device wireless interface 242 for at least initial communications between control device 240 and positioning tags 210.

Network interface 243 can allow control device 240 to communicate with one or more types of wireless networks, such as IEEE 802.11 or WiFi networks. Network interface 243 may primarily be used for communication with an access point (AP) such as a wireless network router. Network interface 243 can allow for access to network 230, which can include the Internet. For example, while not pictured, some smart devices may require that a command or message intended for a smart device be transmitted to a remote server system operated by or on behalf of an entity (e.g., manufacturer) that manages the smart device. This remote server system may then send the message via network 230 to the corresponding smart device.

Control device 240 can include various other components, such as: orientation sensor 244; electronic display 245; and audio output device 246. Orientation sensor 244 may be an accelerometer or gyroscope. Electronic display 245 can be an integrated screen on control device 240. Electronic display 245 may be a touch screen and may thus be used to receive user input. Audio output device 246 can be a speaker, wired audio output interface, or wireless audio output interface. Separate speakers or headphones can be used in combination with audio output device 246 to output audio.

Control device 240 can include processing system 250. Processing system 250 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as RAM, flash memory, an HDD, or SSD. One or more non-transitory processor-readable mediums can be incorporated as part of processing system 250.

Control application 251 can be executed using processing system 250. Control application 251 can be understood as either being integrated as part of an operating system executed by processing system 250 or as a separate application that can be installed and executed via the operating system executed by processing system 250. As examples, control application 251 could be integrated as part of the Android operating system or could be an application that can be acquired via an app store (or other source), installed, and executed. Processing system 250 may also execute one or more other applications 256. Applications 256 can include applications used to control specific smart devices 220. For example, a first application of applications 256 may be used to interact with smart device 220-1, but a second application of applications 256 may be used to interact with smart device 220-2.

Control application 251 can perform various functions, which are performed by various components. In other embodiments, the functions performed by components of control application 251 may be combined or spilt differently. Control application 251 can include: trigger detector 252; analysis engine 253; launcher 254; and tag map datastore 255.

When control device 240 is moved within communication range of a positioning tag of positioning tags 210, a communication session may be established. If both device-to-device wireless interface 120 and device-to-device wireless interface 130 are present in the positioning tags, the communication session may be established between device-to-device wireless interface 242 and device-to-device wireless interface 130 of one or more positioning tags, which can use BLE as the low-power communication protocol. In other embodiments, a communication session between device-to-device wireless interface 241 and device-to-device wireless interface 120 may be established. If multiple positioning tags are within communication range, control device 240 may maintain communication sessions with each of them.

Whether via device-to-device wireless interface 241 or device-to-device wireless interface 242, while one or more communications sessions are active, trigger detector 252 of control application 251 may monitor for a trigger event. A trigger event is an occurrence that indicates user intent to control a smart device. The trigger event may be based on explicit user input. The trigger event could be a user pressing a particular button or sequence of buttons. The trigger event could involve the user performing a gesture on or with control device 240. The trigger event could involve the user shaking or tapping control device 240, which could be detected via an accelerometer (e.g., orientation sensor 244). The user could speak a command to control device 240. The user could activate control application 251 (e.g., selecting control application 251 from a home screen of control device 240). The user could also hold control device 240 in a particular orientation.

In additional or alternative embodiments, the trigger event can involve detecting a trigger that is indicative of the user's intent based on a particular trigger confidence being exceeded. For example, based on the orientation and/or amount of movement of control device 240, a determination may be made with at least a threshold amount of confidence that the user is intending to control a smart device. In some embodiments, a distance and/or orientation analysis with the positioning tags for which a communication session has been established may be performed by analysis engine 253. Based on control device 240 being located within a distance range of a positioning tag and, possibly, with a particular orientation to the positioning tag, the confidence level can be determined that the user wishes to control a particular smart home device.

In some embodiments, when a trigger event has been detected by trigger detector 252, analysis engine 253 is used to determine a distance and, possibly, an orientation with positioning tags 210 with which a communication session is active via device-to-device wireless interface 241, which can be UWB. Analysis engine 253 may cause a distance measurement to be performed, such as via a ToF analysis to each positioning tag with which a communication session is active. Based on the distance analysis, distances between control device 240 and each positioning tag 210 for which a communication session is active are determined. In some embodiments, an angle of arrival analysis or other form of relative orientation analysis is performed, which can involve determining a direction from which a message originated based on a phase difference at which signals were received via multiple antennas of device-to-device wireless interface 241.

Analysis engine 253 has access to mapping data that indicates particular distances and, possibly, orientations mapped to the control of particular smart devices. As an example involving only distance, a user may have previously created a mapping that is based on when the user is sitting on the user's couch for when the user desires to control the user's smart television. In this example, the smart television is smart device 220-1. Positioning tag 210-1 is in the vicinity of the smart television and the couch is 4 meters from positioning tag 210-1. Therefore, when the distance measurement made using device-to-device wireless interface 241 indicates that control device 240 is within a threshold range (e.g., +/−0.5 meters) of 4 meters from positioning tag 210-1, analysis engine 253 determines that the smart television (smart device 220-1) is intended to be controlled by the user.

As another example, in some embodiments, orientation of control device 240 with respect to positioning tags 210 is additionally used to determine the smart device of smart devices 220 with which a user desires to interact. Returning to the previous example, next to the user's smart television is a smart lamp serving as smart device 220-2 that has been mapped to positioning tag 210-2. Positioning tag 210-2 is also about 4 meters from control device 240. Therefore, when a distance measurement made using device-to-device wireless interface 241 indicates that control device 240 is within a threshold range of 4 meters from both positioning tag 210-1 and positioning tag 210-2, orientation can additionally be used to determine whether control of smart device 220-1 (the smart television) or smart device 220-2 (the smart lamp) is intended by the user. Based on determining the orientation of control device 240 with respect to each of positioning tags 210-1 and 210-2, analysis engine 253 can determine whether control device 240 is pointed in the direction of positioning tag 210-1 or positioning tag 210-2. Based on which positioning tag control device 240 is pointed at, the mapped smart device is selected for control.

Launcher 254 causes an interface for the identified smart device to be activated on control device 240 to enable user interaction with the identified smart device. Depending on the smart device, launcher 254 may perform various actions. For example, for a smart device manufactured or distributed by a third-party from the entity that provides control application 251, launcher 254 may launch an application of applications 256 that is mapped to the smart device. As an example, returning to the previous example, the smart lamp may be distributed by a third-party that has its own application installed on control device 240 as part of applications 256. This application can be launched or otherwise activated to enable user control of the smart lamp.

Launcher 254 may launch an interface that is part of control application 251 or the operating system of control device 240 that allows for control of the identified smart device. Control application 251 may be part of an application that controls many different types of smart devices with each smart device being provided its own interface within the application. An example of such an arrangement is the Google® Home application, which can control various types of smart devices distributed by Google® or third-party devices that have integration with the Google® environment.

Launcher 254 may set the default smart device for a future action in either control application 251 or an application of applications 256 based on the identified smart device. As an example, various streaming service applications allow for content to be streamed to another smart device, which can be referred to as "casting." The identified smart device may be set as the default device for casting, thus saving the user from having to identify the correct smart device to which casting is to be performed. Such an arrangement when a particular smart device is selected as the default for control may be particularly beneficial if the user has multiple instances of the same type of smart device within the user's home. For example, users may have multiple: smart thermostats; smart streaming sticks; smart televisions; home assistants; smart home hubs; smart lights; smart switches; smart hazard detectors; etc.

In some embodiments, in combination with the selection of the default smart device, either a particular application or interface may be launched, or a list of available applications may be presented for user selection. As an example of this, a user may subscribe or use multiple streaming applications. Launcher 254 can prompt the user to select the streaming application the user desires to use. When the streaming application is launched, the streaming application may be launched directly on the identified smart device or may be launched on control device 240 with the identified smart device selected as the default smart device for output ("casting") of streaming content.

In order to identify the correct smart device which a user intends to control, a mapping of position tags with smart devices, distances, orientations (if used), and applications or other forms of interfaces is used. This mapping may be established using mapping service server system 260 or may be directly established at the control application in tag maps datastore 255 ("tag maps 255").

Mapping service server system 260 can be accessible via network 230. A mapping engine 262, which may be in the form of software executed by general-purpose underlying hardware (e.g., a cloud-computing platform), can be used to establish mappings between user accounts, positioning tags, smart devices, distances and/or orientations, and applications/interfaces. Mapping engine 262 may alternatively or partially be executed as part of control application 251.

As part of an initial configuration process performed via mapping engine 262, a positioning tag of positioning tags 210 can be mapped to a particular user account of the user. This user account may be accessible by system 260 in user accounts database 264. The positioning tag may also be mapped to a particular smart device. As an example, positioning tag 210-1 has been mapped to smart device 220-1 as indicated by the "tag mapping" indication on FIG. 2.

Continuing with the initial configuration process, the user may be instructed to install the positioning tag in a location that the user will associate with the mapped smart device. This position may be on the smart device, nearby the smart device, or in some other form of location that the user will mentally associate with the smart device (e.g., the earlier example of a positioning tag by a front door for a smart doorbell located at a gate).

Continuing with the initial configuration process, the user of control device 240 may be instructed to take control device 240 to a location from which the user wants the mapped smart device to be controlled. The user may also be instructed to orient control device 240 to an orientation relative to the positioning tag that the user desires to be mapped with control of the mapped smart device. The distance between the positioning tag and, possibly, the orientation may be measured using device-to-device wireless interface 241, such as via UWB. Therefore, while the user may be instructed in the form of locations from where the user desires to control the mapped smart device, the mapping uses the distance between the positioning tag and the control device, rather than an absolute location of the control device, for identification of the correct smart device. Returning to the earlier example, the user may sit on the couch and point control device 240 toward the positioning tag mapped to the smart television. If the user desires multiple locations/orientations being associated with a particular smart device, the user can optionally configure additional distances and orientations to be mapped to the smart device. Table 1 provides a listing of example mappings for a particular user account to which three positioning tags have been mapped within the user's house.

TABLE 1

| Positioning Tag Identifier | Smart Device | Distance | Relative Orientation | Application/ Interface |
|---|---|---|---|---|
| 39A31B4 | Smart Television | 4 m | 0° | Set as default casting device |
| 27FF220 | Smart Lamp | 4 m | 0° | "XYZ Lamp Corp." Application |
| 8900AC7 | Smart Thermostat | 1 m, 0.2 m | [any] | Interface within Control Application |

Tag maps 266 of system 260 can be stored using a non-transitory processor-readable medium and can store mappings, such as those exemplified in Table 1. The mappings for a particular user account may additionally or alternatively be stored in tag map datastore 255. By storing in tag map datastore 255, when a smart device is to be identified, Internet access to access mapping service server system 260 would not be necessary. Further, the response time may be decreased. When a change is made to tag maps 266, tag map datastore 255 may be synced or tag map datastore 255 may be synced on launch of control application 251 when access to network 230 is available.

In some embodiments, rather than a user having to perform a process where the user manually identifies "locations" (which are translated to distances) for particular positioning tag and smart device mappings, a learning process may be performed over a period of time via control application 251. After a positioning tag has been mapped to a particular smart device, which applications or interfaces a user manually activates can be monitored. When a user manually activates an application or interface associated with a smart device, a distance and, possibly, orientation measurement between the associated positioning tag and control device 240 may be made. After a time, such as after at least a threshold number of manual activations have occurred for a particular application or interface, a clustering algorithm may be applied, or a machine learning model may be trained using the previous manual activations as the training data set. For example, the ML model may be trained using distance, orientation, and positioning tag identifiers as inputs, and the truth-tagged output (based on the user's manual selection of an application or interface) may be an indication of the user's intended application/interface.

Figure 3:
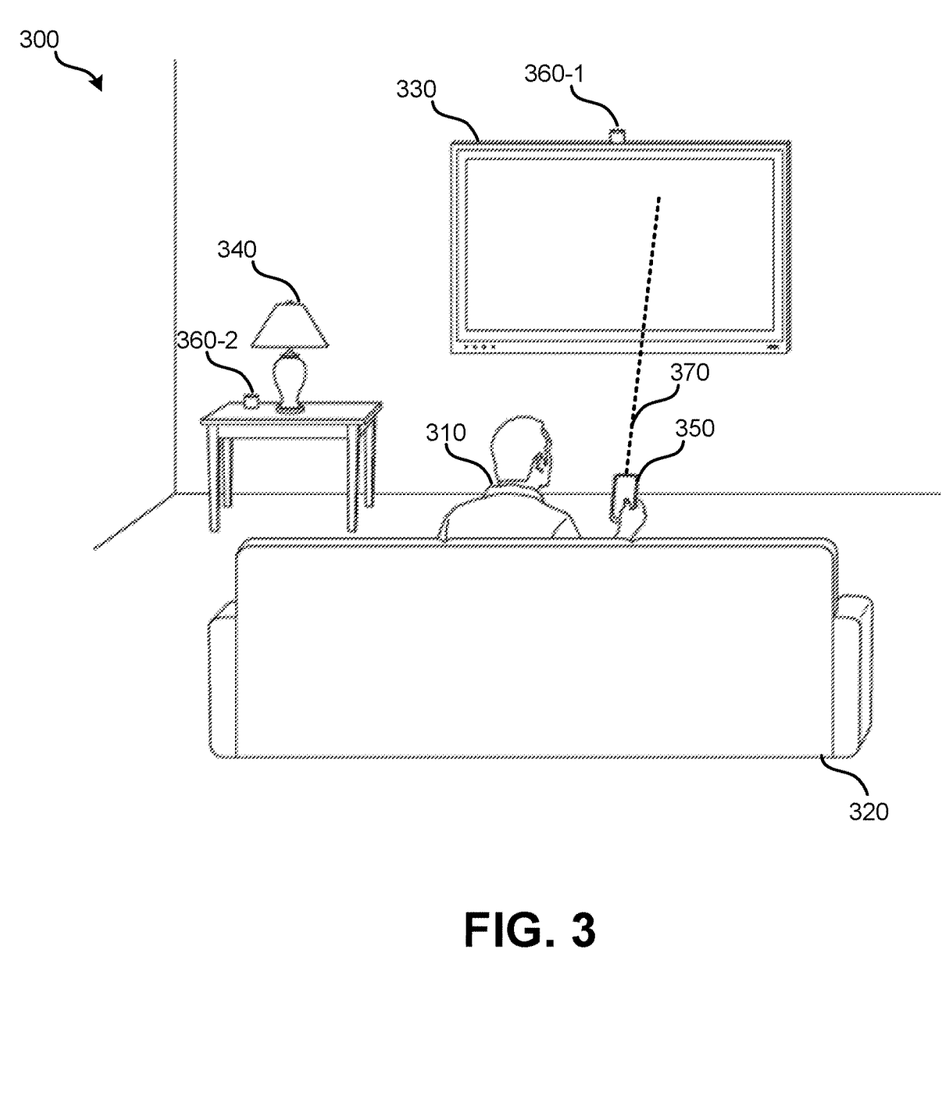
FIG. 3 illustrates an embodiment of smart home devices being controlled using multiple positioning tags.

FIG. 3 illustrates an embodiment 300 of smart home devices being controlled using multiple positioning tags. In FIG. 3, user 310 is seated on couch 320. Within the same room are two smart devices (smart television 330 and a smart lightbulb in lamp 340) that can be controlled via control device 350, which in this example is the user's smartphone. Positioning tag 360-1 has previously been mapped to smart television 330 and positioning tag 360-2 has previously been mapped to a smart lightbulb in lamp 340.

As in the previous example, both positioning tag 360-1 and positioning tag 360-2 have been mapped to a distance of 4 meters, indicative of the user likely being seated on one of the cushions of couch 320. Additionally, an orientation of control device 350 has been mapped to each of positioning tags 360. The orientation of control device 350 may be measured off of an axis in the plane of the electronic display of the control device from a center of control device 350 through a center of a top edge of control device 350 (as indicated by direction 370), which is similar to how a user would aim a conventional RF- or IR-based remote control. As seen in FIG. 3, user 310 is approximately pointing control device 350 at positioning tag 360-1 as indicated by direction 370. Therefore, based on the mapped relative orientation and distance of positioning tag 360-1, a determination can be made that user 310 desires to interact with smart television 330 rather than the smart lightbulb in lamp 340.

In response to a triggering event, which may be based on user input provided to control device 350, based on the tag mapping of positioning tag 360-1 to smart television 330, the relative orientation of control device 350, and the distance of control device 350 to positioning tag 360-1, an application or interface for smart television 330 can be launched or otherwise presented to user 310 via control device 350. Alternatively, smart television 330 may be set as default for streaming or casting and/or a listing of available streaming applications may be presented via control device 350.

In contrast, if control device 350 was instead pointed toward positioning tag 360-2, the same triggering event would have caused an application or interface for the smart lightbulb in lamp 340 to be launched or otherwise presented to user 310 via control device 350.

Continuing with the example, while smart television 330 may only be mapped to the distance at which couch 320 is located, user 310 may also desire that the smart lightbulb in lamp 340 be controlled at a short distance, such as 0.75 meters, such as when user 310 is standing next to lamp 340. Therefore if user 310 is standing approximately 0.75 meters from positioning tag 360-2, the interface or application for the smart lightbulb in lamp 340 may be launched in response to a triggering event regardless of relative orientation as there is no ambiguity as to which smart device user 310 intends to control.

Figure 4:
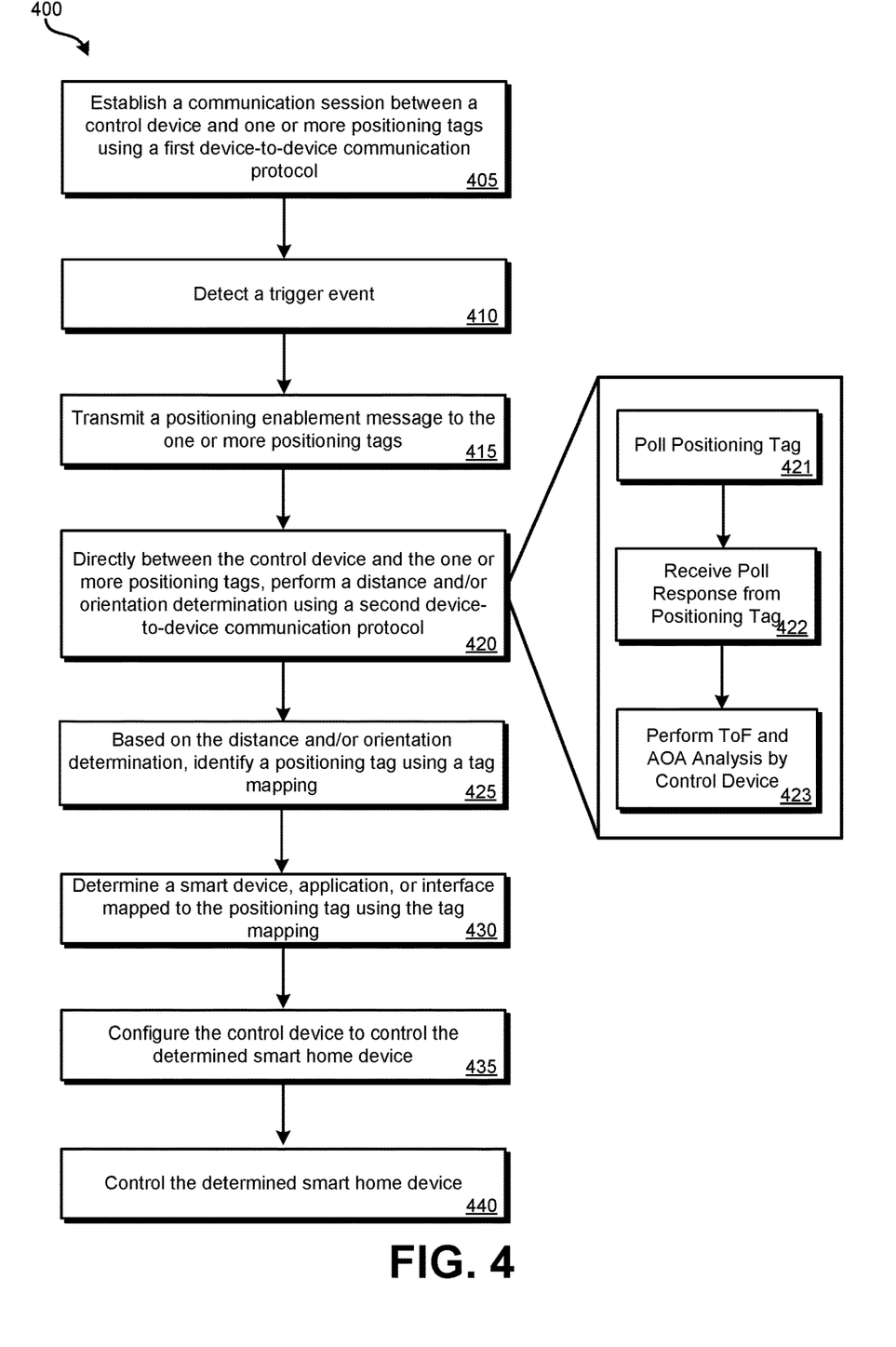
FIG. 4 illustrates an embodiment of a method for using a positioning tag to facilitate control a smart home device.

Various methods may be performed using the positioning tags and systems of FIGS. 1 and 2. FIG. 4 illustrates an embodiment of a method 400 for using a positioning tag to facilitate control a smart home device. Method 400 involves arrangements in which two device-to-device communication interfaces in each of the positioning tags and the control device are present. Method 400 is performed after a mapping between positioning tags, smart devices, distances/orientations, and applications/interfaces have been established. Method 400 can be performed by using one or more positioning tags as detailed in FIG. 1 that have multiple device-to-device wireless interfaces and system 200, using a control device that has multiple device-to-device wireless interfaces.

At block 405, a communication session between a control device and one or more positioning tags is established. The control device may establish a communication session with any positioning tag within communication range. In some embodiments, the positioning tags may need to have been previously registered with the control device to permit such communication sessions to be established. The communications sessions of block 405 are performed using a first device-to-device communication interface, such as device-to-device wireless interface 242 of FIG. 2, or device-to-device wireless interface 130 of positioning tag 100 of FIG. 1. This device-to-device communication may use BLE or some other very low power communication protocol.

As part of block 405, a determination is made as to whether each positioning tag is recognized or not recognized. If all of the positioning tags sensed are not recognized, a state machine of the control device may be set to a first provisional state. In the first provisional state, the user may be prompted by the control device to perform a configuration process, such as detailed in relation to FIG. 6, in order to enable use of the positioning tag to facilitate control of the smart device. Further blocks of method 400 may not be performed in the provisional state. If at least one positioning tag is recognized at block 405 and, possibly, that tag has been mapped to an "anchor" role as detailed in relation to FIG. 6, the state machine may be set to an operating mode. In the operating mode, method 400 continues to block 410 of method 400. If a tag is recognized but is determined to have been mapped to a "find-my-device" role, as detailed in relation to FIG. 6, the tag may be ignored and not used for method 400. If only "find my device" tags are detected at block 405, method 400 may not proceed past block 405 and a second provisional state may be entered. A message may be presented or otherwise output to a user that indicates only tags that are used for finding devices were detected and that no eligible anchor tags were detected. The user may also be instructed to configure anchor tags to facilitate control of the smart device to the future.

As a user moves throughout a home or other form of structure with a control device, at least until a trigger event is detected, the control device may continually establish communication sessions with any positioning tags within communication range. In some embodiments, a communication session may only be established if the signal strength is above a threshold value, which is greater than the minimum signal strength to establish a communication session.

At block 410, while one or more communication sessions are active, a trigger event is detected. As previously detailed, the trigger event may be an explicit user action indicative of the user desiring to control a smart home device, or the trigger event may be based on an analysis of the conditions involving the control device, user, and positioning tags. For the latter arrangement, if at least a threshold confidence is met indicating that the user desires to control a smart device, the trigger event is determined to have been detected. In some embodiments, the user causing the control application to be launched may be the trigger event.

At block 415, in response to the trigger event having been detected at block 410, a positioning enablement message is transmitted to the one or more positioning tags with which the control device has a communication session established. The positioning enablement message is transmitted via the first device-to-device communication protocol of block 405, which may be BLE. Since the communication session was previously established at block 405, the message of block 415 can be transmitted immediately following the trigger event being detected.

In response to receiving the positioning enablement message of block 415, each positioning tag to which the message was transmitted may activate a second device-to-device wireless communication interface. This second device-to-device wireless communication interface can be used for range finding (distance) and relative orientation. The second device-to-device wireless communication protocol may be UWB. In other embodiments, the second device-to-device wireless interface may use WiFi RTT, BLE high accuracy distance measurements, or some other form of device-to-device ranging, which can rely on a ToF measurement and/or phase measurements.

At block 420, directly between the control device and the one or more positioning tags to which the positioning enablement message was transmitted at block 415, a distance determination can be performed using the second device-to-device wireless communication interface and the second device-to-device wireless communication protocol. The distance measurement may be based on a roundtrip ToF measurement. If orientation of the control device is additionally used, the orientation may be based on an AoA analysis at the control device based on a phase difference of the received response from the positioning tag at multiple antennas of the control device.

Blocks 421-423 more specifically describe the distance measurement and relative orientation analysis of block 420. At block 421, the control device may poll the positioning tag through the second device-to-device wireless communication interface. This poll message can include an identifier of the positioning tag such that the correct tag responds. The positioning tag may receive the poll message and respond with a poll response message. A fixed amount of delay occurs between the positioning tag receiving the poll message and the positioning tag transmitting the poll response message via the device-to-device wireless communication protocol (e.g., UWB). This poll response message can indicate an identifier of the positioning tag which transmitted the poll response. At block 422, the poll response message is received by the control device. At block 423, a ToF analysis is performed by the control device. The ToF analysis involves the roundtrip transit amount of time for the poll and response messages (with the delay at the positioning tag removed) being used to determine the distance between the positioning tag and the control device using the propagation speed of electromagnetic radiation. If relative orientation is also to be used, an AoA analysis may be performed by the control device to identify the direction from which the response message was received by the control device. The AoA analysis can be based on a phase difference of the received message across multiple antennas of the control device or via some other method. From the AoA analysis, the relative orientation of the control device to the direction from which the UWB poll response message (or some other message) was received can be determined. Blocks 421-423 can be repeated for each positioning tag to which the control device transmitted a positioning enablement message.

At block 425, based on the distance determined for each of the one or more positioning tags and, possibly, the determined orientation, one of the positioning tags is identified. A positioning tag is identified based on a previously created tag mapping, which can be stored locally by the control device or remotely at a mapping service server system. The tag mapping can be accessed to determine for which specific positioning tag: the determined distance and, possibly, orientation determined at block 420 matches, within a threshold range, a stored distance (and possibly a stored orientation) for the positioning tag.

As an example of this, consider method 400 being performed for Table 1 as a distance-only embodiment. For positioning tag "8900AC7," a distance of 1.04 meters is determined; for positioning tag "27FF220," a distance of 12 m is determined; for positioning tag "39A31B4," no communication session was established. Therefore, assuming the threshold range is at least 0.05 m, positioning tag "8900AC7" is identified at block 425 since 1.04 m is within the threshold range of 1 m mapped to tag "8900AC7."

If no match is made at block 425, method 400 may end and no action may be taken by the control device. Alternatively, the closest positioning tag may be selected (regardless of any distance or orientation threshold) if no match is identified.

At block 430, the smart device, interface, or application mapped to the identified positioning tag of block 425 is identified. If a particular interface or application is identified, this interface (e.g., a particular control screen within an application) or application is used to control the smart device that has been previously mapped to the tag identified at block 425.

At block 435, the control device is configured to control the determined smart home device. Block 435 can include the state machine of the control device being changed from the operating mode to a control mode. If an application was identified at block 430, as part of the control mode, the application may be executed or otherwise launched and presented to the user by the control device. This application may be provided by a third-party entity separate from the entity that provides the control application being executed on the control device. If an interface was identified at block 430, the specific interface for the smart device within an application or operating system may be executed or launched. For example, this interface may be part of the control application. If the smart device was identified to be set as the default smart device, such as for casting or streaming, no application or interface may be launched by the control device, but when the user does launch such an application or interface, the smart device may be selected as the default option. As another example, these arrangements can be combined. For example, if a user has multiple smart thermostats in the user's home, a particular application may be launched, and the particular identified thermostat may be selected as the default for control within the application.

In some embodiments, at block 435, when multiple applications or interfaces can be used for a particular smart device, the control device may present a menu of the multiple applications or interfaces to allow the user to select the desired application or interface. As an example of this, for a streaming stick, multiple streaming applications may be able to cast to the streaming stick. A menu that presents only the applications that can use the smart device may be presented.

At block 440, the control device is used to control the smart device via the application, interface, or other arrangement that was configured at block 435. Communication between the smart home device and the control device may be device-to-device, via a network (e.g., network 230), or via a network and a remote server system. For example, a manufacturer of a third-party device may use a cloud-based service to control access to the smart device. The control device may send commands or requests to the cloud-based service, which may communicate with the smart device.

Notably, method 400 does not involve any communication between positioning tags and smart devices. Since positioning tags in combination with control device 240 are used to select the correct interface, application, or device to select as default, no integration or changes are required on the side of the smart device or its associated applications or interfaces. Therefore, the arrangement of method 400 can be used with a very high number of different types of smart devices.

Figure 5:
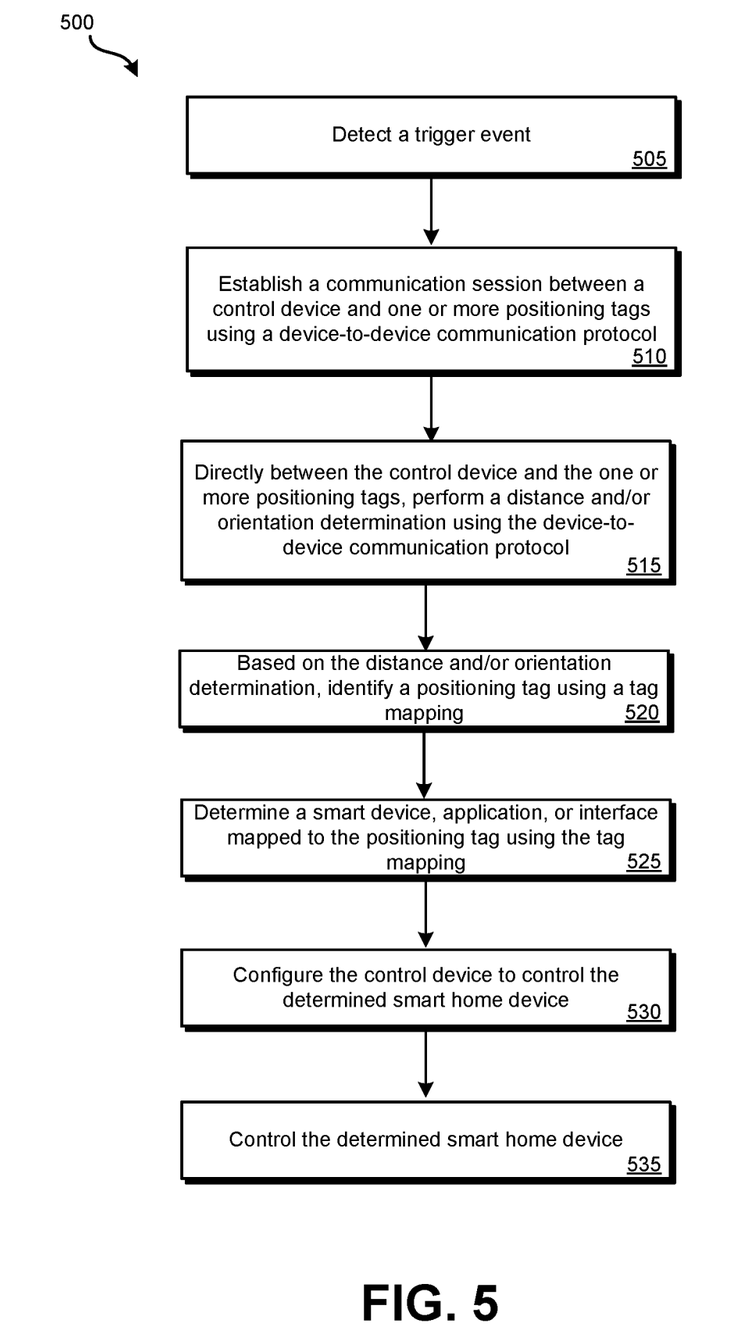
FIG. 5 illustrates another embodiment of a method for using a positioning tag to facilitate control a smart home device.

While method 400 is focused on using multiple device-to-device wireless communication protocols and interfaces, method 500 involves only using a single device-to-device wireless communication protocol, such as UWB, through which a distance measurement and, possibly, orientation of the control device can be determined. FIG. 5 illustrates an embodiment of a method 500 for using a positioning tag to facilitate control of a smart home device. Method 500 is performed after a mapping between positioning tags, smart devices, distances/orientations, and applications/interfaces have been established. Method 500 can be performed by using one or more positioning tags as detailed in FIG. 1 that has at least one device-to-device wireless interface and system 200 of FIG. 2 using a control device that has at least one device-to-device wireless interface. Method 500 can, for example, be performed using one or more positioning tags and a control device that only use UWB for communication between the tags and the control device.

At block 505, a trigger event is detected. As previously detailed, the trigger event may be an explicit user action indicative of the user desiring to control a smart home device, or the trigger event may be based on an analysis of the conditions involving the control device, user, and positioning tags. For the latter arrangement, if at least a threshold confidence is met indicating that the user desires to control a smart device, the trigger event is determined to have been detected. In some embodiments, the user causing the control application to be launched may be the trigger event.

At block 510, in response to the trigger event of block 505, a communication session between a control device and one or more positioning tags is established. The control device may establish a communication session with any positioning tag within communication range via the device-to-device communication protocol to be used for the distance determination (e.g., UWB, WiFi Direct, BLE). In some embodiments, the positioning tags may need to have previously been registered with the control device to permit communication sessions.

In some embodiments, these communication sessions are initiated prior to block 505, such as based on one or more positioning tags being within communication range of the control device. As a user moves throughout a home or other form of structure with a control device, at least until a trigger event is detected, the control device may continually establish communication sessions with any positioning tags within communication range. In some embodiments, a communication session may only be established if the signal strength is above a threshold value, which is greater than the minimum signal strength to establish a communication session.

As part of block 510, a determination is made as to whether each positioning tag with which a communication session is established is recognized or not recognized. If all of the positioning tags are not recognized, a state machine of the control device may be set to a first provisional state. In the first provisional state, the user may be prompted by the control device to perform a configuration process, such as detailed in relation to FIG. 6, in order to enable use of one or more of the positioning tags to facilitate control of a smart device. Further blocks of method 500 may not be performed in the first provisional state. If at least one positioning tag is recognized at block 510 and that tag has been mapped to an "anchor" role as detailed in relation to FIG. 6, the state machine may be set to an operating mode. In the operating mode, method 500 continues to block 515. If a tag is recognized but is determined to have been mapped to a "find my device" role, as detailed in relation to FIG. 6, the tag may be ignored and not used for method 500. If only "find my device" tags are detected at block 510, method 500 may not proceed past block 510 and a second provisional state may be entered. While in the second provisional state, such as in response to input to the control device from a user, a message may be presented or otherwise output to a user that indicates only tags that are used for finding devices were detected and that no eligible anchor tags were detected. The user may also be instructed to configure anchor tags to facilitate control of the smart device to the future.

At block 515, directly between the control device and the one or more positioning tags, a distance determination can be performed using the device-to-device wireless communication interface and the device-to-device wireless communication protocol (e.g., UWB, WiFi Direct, BLE). In general, the distance measurement can be based on a roundtrip ToF measurement. If orientation of the control device is additionally used, the orientation may be based on an AoA analysis at the control device based on a phase difference of the received response from the positioning tag at multiple antennas of the control device. Further detail regarding block 515 is provided in relation to blocks 421-423 of FIG. 4.

At block 520, based on the distance determined for each of the one or more positioning tags and, possibly, the determined orientation, one of the positioning tags is identified. A positioning tag is identified based on a previously created tag mapping, which can be stored locally by the control device or remotely at a mapping service server system. The tag mapping can be accessed to identify for which specific positioning tag, the determined distance and, possibly, orientation determined at block 520 matches, within a threshold range, the distance (and possibly orientation) stored for the positioning tag.

If no match is made at block 520, method 500 may end and no action may be taken by the control device. Alternatively, the closest positioning tag may be selected (regardless of any distance or orientation threshold) if no match is identified.

At block 525, the smart device, interface, or application mapped to the identified positioning tag of block 520 is identified. If a particular interface or application is identified, this interface (e.g., a particular control screen within an application) or application is used to control the smart device that has been previously mapped to the tag identified at block 520.

At block 530, the control device is configured to control the determined smart home device. Block 530 can involve the state machine of the control device being set to a control mode. If an application was identified at block 525, the application may be executed or otherwise launched and presented to the user by the control device. This application may be provided by a third-party entity separate from the entity that provides the control application being executed on the control device. If an interface was identified at block 525, the specific interface for the smart device within an application or operating system may be executed or launched. For example, this interface may be part of the control application. If the smart device was identified to be set as the default smart device, such as for casting or streaming, no application or interface may be launched by the control device, but when the user does launch such an application or interface, the smart device may be selected as the default option. As another example, these arrangements can be combined. For example, if a user has multiple smart thermostats in the user's home, a particular application may be launched, and the particular identified thermostat may be selected as the default for control within the application.

In some embodiments, at block 530, when multiple applications or interfaces can be used for a particular smart device, the control device may present a menu of the multiple applications or interfaces to allow the user to select the desired application or interface. As an example of this, for a streaming stick, multiple streaming applications may be able to cast to the streaming stick. A menu that presents only the applications that can use the smart device may be presented.

At block 535, the control device is used to control the smart device via the application, interface, or other arrangement that was configured at block 530. Communication between the smart home device and the control device may be device-to-device, via a network (e.g., network 230), or via a network and a remote server system. For example, a manufacturer of a third-party device may use a cloud-based service to control access to the smart device. The control device may send commands or requests to the cloud-based service, which may communicate with the smart device.

Figure 6:
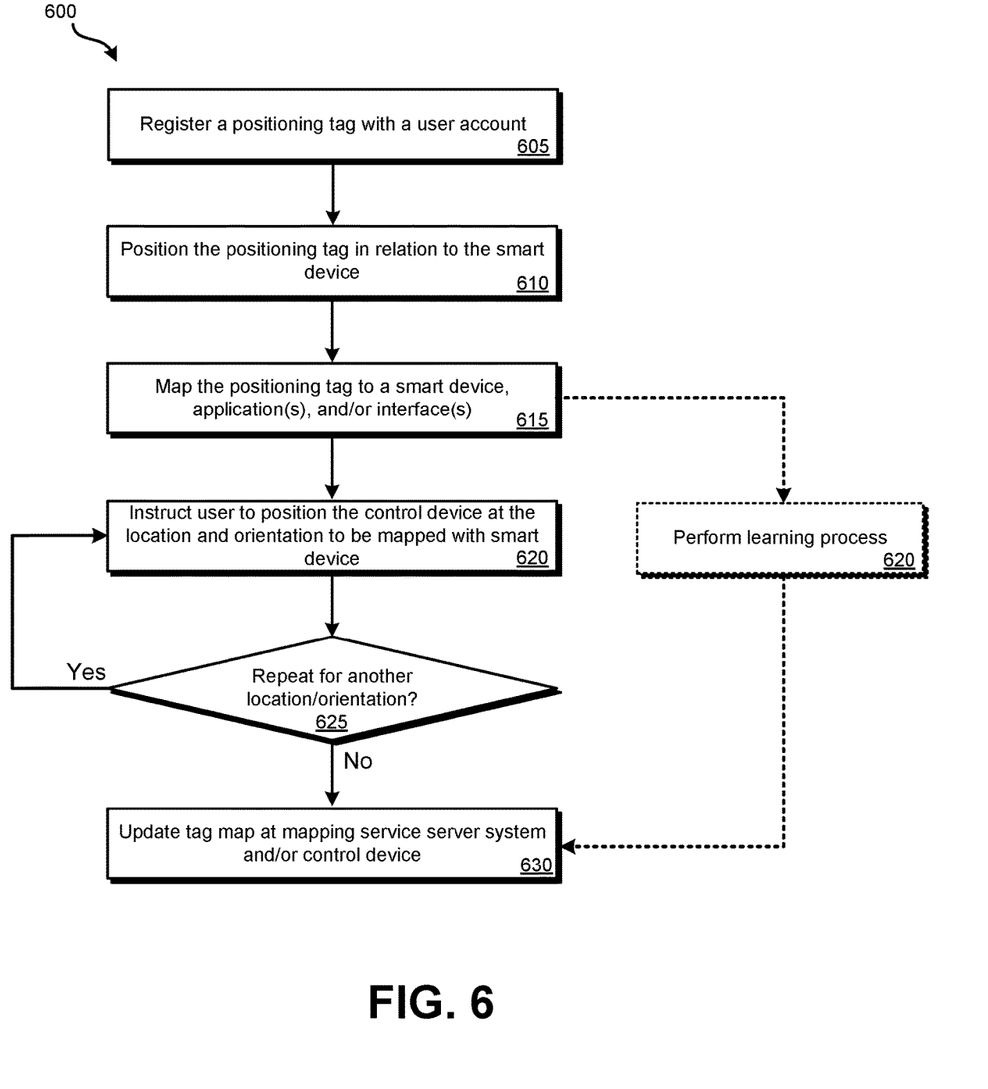
FIG. 6 illustrates an embodiment of a method for mapping a positioning tag with a smart device, distance, and orientation.

Prior to method 400 or method 500 being performed, a positioning tag needs to be mapped to a smart device, a distance, and, possibly, an orientation. FIG. 6 illustrates an embodiment of method 600 mapping a positioning tag with a smart device, distance, and orientation. Method 600, as detailed below, uses orientation in addition to distance. However, orientation is optional; other embodiments of method 600 can rely on distance alone. Method 600 can be performed using the positioning tags of FIG. 1 and system of FIG. 2. Method 600 can be used for embodiments in which two different device-to-device communication protocols (e.g., BLE, UWB) are used or embodiments in which a single device-to-device communication protocol (e.g., UWB) is used.

At block 605, the positioning tag is registered to a user account. This can involve storing an identifier of the positioning tag in association with the user account and, possibly, registering the positioning tag with the control device such that the control device is permitted to establish communication sessions with the positioning tag in the future. As part of the registering process, the tag may be assigned one of at least two possible roles, which is then stored in associated with the registered tag, such as by a mapping service server system and/or by the control application executed on the control device. A first role, which can be referred to as a "find my device" role, is used for tags that are attached with devices that are oftentimes moved around and may be misplaced or lost by a person. For example, such tags may be attached with keys, smartphones, watches, gaming devices, tablet computers, remote controls or other devices that may be easily misplaced. A second role, which can be referred to as a "anchor" role, are for tags that are placed in relation to a smart device and used in association with methods 400 and 500. As part of block 605, the positioning tag may be assigned the anchor role. Tags may be repurposed and thus, may in the future or past function in another role, such as the "find my device" role. In some embodiments, tags are mapped to a particular role by the manufacturer and can only be used for one of the roles.

At block 610, the user may be instructed to place the positioning tag in relation to the smart device to which it is being mapped. The instructions may be output via audio or visually on a display of the control device. Block 610 can involve placing the positioning tag on or near (e.g., within 1 meter) of the smart device. Block 610 can also include placing the positioning tag somewhere else that the user will associate with the smart device (e.g., near a front door for a smart doorbell located at a front gate).

At block 615, the positioning tag is mapped to a smart device, one or more applications, one or more interfaces, or some combination thereof. The user may select the appropriate applications, interface, etc. to which the tag is to be mapped. The user may input a name for the smart device or otherwise select the smart device (e.g., from a list). The user may also provide a name for the tag being mapped with a smart device. As a simple example, if the user is mapping a positioning tag to the smart television in the user's basement, the user may name the positioning tag as "downstairs television tag." The specific order in which blocks 610 and 615 are performed can vary by embodiment.

At block 620, the user is instructed to position the control device at a location that the user wants mapped with control of the smart device. The user may also be instructed to orient the smart device relative to the tag in the orientation that the user wants mapped with control of the smart device. Once the control device is in the desired location and orientation, the user may provide input. In response to the input, a distance and possibly orientation analysis can be performed to determine the distance and orientation between the mapped positioning tag and the control device.

At block 625, a user may repeat block 620 for other locations and, possibly, orientations that the user desires to have mapped to a particular smart device. For example, for a smart television, a user may desire that when the user is seated in a recliner and on a couch both of these locations are mapped to control of the smart television.

In some embodiments, in addition or in alternate to the user having to explicitly move the control device to a particular location to be mapped to control of a specific smart device, a learning process can be performed at block 620. In block 620, after positioning tags have been registered and mapped to smart devices, the control device can monitor where the control is located (and, possibly, in what orientations) relative to positioning tags. Over time, a set of training data is built that indicates the distance (and possibly orientation) to positioning tags along with the smart device that the user controlled at those distances and orientations. Once a sufficient training data set has been built, a machine learning model can be trained, or a clustering algorithm can be applied. For future use as part of method 400 or method 500, distance and orientation measurements to positioning tags can be analyzed using the trained machine learning model or clustering algorithm to identify the smart device with which the user is intending to interact.

At block 630, which may be performed as blocks 605-625 are performed, a tag map is updated to indicate the mapping relationships between the smart devices, applications, interfaces, positioning tags, distances, and orientations. The tag map can be stored at mapping service server system, the control device, or both. If stored at both, one of the maps can serve as a master mapping and the other is updated to conform to the master mapping.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for controlling a smart home device, the system comprising:
    a positioning tag, comprising:
        a positioning tag housing;
        a first device-to-device communication interface housed by the positioning tag housing that uses a first device-to-device communication protocol;
        a second device-to-device communication interface housed by the positioning tag housing that uses a second device-to-device communication protocol;
        a processing system, comprising one or more processors, housed by the positioning tag housing, and in communication with the first device-to-device communication interface and the second device-to-device communication interface, wherein the positioning tag is mapped to a separate smart home device; and
    an application executed by a mobile computerized control device, wherein the application is configured to cause the mobile computerized control device to:
        establish a session with the positioning tag via the first device-to-device communication protocol;
        detect a trigger event indicative of a user desiring to control the separate smart home device;
        in response to detecting the trigger event, cause the mobile computerized control device to transmit a positioning enablement message to the positioning tag via the first device-to-device communication protocol;
        receive a distance measurement signal via the second device-to-device communication protocol; and
        based on the received distance measurement signal via the second device-to-device communication protocol, cause a smart device interface that controls the separate smart home device to be activated on the mobile computerized control device.

2. The system for controlling the smart home device of claim 1, wherein the received distance measurement signal is used by the mobile computerized control device to determine a distance to the positioning tag from the mobile computerized control device based upon a time-of-flight analysis.

3. The system for controlling the smart home device of claim 1, wherein the received distance measurement signal is used by the mobile computerized control device to determine an orientation of the mobile computerized control device relative to the positioning tag.

4. The system for controlling the smart home device of claim 3, wherein the first device-to-device communication protocol is Bluetooth Low Energy (BLE), and the second device-to-device communication protocol is ultra-wide band (UWB).

5. The system for controlling the smart home device of claim 1, further comprising the mobile computerized control device, wherein the mobile computerized control device is a smartphone.

6. The system for controlling the smart home device of claim 1, further comprising the mobile computerized control device, wherein the mobile computerized control device is a smartwatch.

7. The system for controlling the smart home device of claim 1, wherein the trigger event is detected by the mobile computerized control device without explicit input from the user.

8. The system for controlling the smart home device of claim 1, wherein the trigger event comprises user input.

9. The system for controlling the smart home device of claim 1, wherein the positioning tag does not communicate with the smart home device.

10. The system for controlling the smart home device of claim 1, wherein the smart device interface is a second application installed on the mobile computerized control device, the second application being separate from the application.

11. A method for facilitating control of a smart home device, the method comprising:
    establishing, by a control device, a communication session with a positioning tag via a first device-to-device communication protocol;
    detecting, by the control device, a trigger event indicative of a user desiring to control the smart home device;
    in response to detecting the trigger event, transmitting, by the control device, a positioning enablement message to the positioning tag via the first device-to-device communication protocol;
    receiving, by the control device, a distance measurement signal from the positioning tag via a second device-to-device communication protocol; and
    based on the received distance measurement signal via the second device-to-device communication protocol, causing, by the control device, a smart device interface that controls the smart home device to be activated on the control device.

12. The method for facilitating control of the smart home device of claim 11, wherein the positioning tag comprises:
    a first device-to-device communication interface that uses the first device-to-device communication protocol; and
    a second device-to-device communication interface that uses the second device-to-device communication protocol.

13. The method for facilitating control of the smart home device of claim 11, further comprising:
    determining, by the control device, a relative orientation of the control device with respect to the positioning tag using the received distance measurement signal.

14. The method for facilitating control of the smart home device of claim 13, wherein the smart device interface caused to be activated is further based on the determined relative orientation.

15. The method for facilitating control of the smart home device of claim 11, further comprising:
    identifying the positioning tag based at least in part on the distance measurement signal.

16. The method for facilitating control of the smart home device of claim 15, wherein identifying is performed by analyzing a distance measurement based on the distance measurement signal using a stored tag mapping.

17. The method for facilitating control of the smart home device of claim 11, wherein the first device-to-device communication protocol is Bluetooth Low Energy (BLE), and the second device-to-device communication protocol is ultra-wide band (UWB).

18. The method for facilitating control of the smart home device of claim 11, wherein the control device is selected from the group consisting of: a smartphone, a smartwatch, and a tablet computer.

19. The method for facilitating control of the smart home device of claim 11 wherein the smart device interface is a second application installed on the control device, the second application being maintained by an entity separate from an entity that provides the positioning tag.

20. A non-transitory processor-readable medium for facilitating control of a smart home device by a control device, comprising processor-readable instructions configured to cause one or more processors to:
    establish a communication session with a positioning tag via a first device-to-device communication protocol;
    detect a trigger event indicative of a user desiring to control the smart home device;
    in response to detecting the trigger event, cause a positioning enablement message to be transmitted to the positioning tag via the first device-to-device communication protocol;
    analyze a distance measurement signal received from the positioning tag via a second device-to-device communication protocol; and
    based on the received distance measurement signal via the second device-to-device communication protocol, cause a smart device interface that controls the smart home device to be activated on the control device.

* * * * *